US006542270B2

(12) United States Patent
Perkins et al.

(10) Patent No.: US 6,542,270 B2
(45) Date of Patent: Apr. 1, 2003

(54) INTERFERENCE-ROBUST CODED-MODULATION SCHEME FOR OPTICAL COMMUNICATIONS AND METHOD FOR MODULATING ILLUMINATION FOR OPTICAL COMMUNICATIONS

(75) Inventors: Matthew R. Perkins, Sunrise, FL (US); Robert E. Stengel, Pompano Beach, FL (US); Vernon A. Allen, Sunrise, CA (US)

(73) Assignee: Motorola, Inc., Schaumburg, IL (US)

( * ) Notice: Subject to any disclaimer, the term of this patent is extended or adjusted under 35 U.S.C. 154(b) by 26 days.

(21) Appl. No.: 09/733,717

(22) Filed: Dec. 8, 2000

(65) Prior Publication Data

US 2002/0071161 A1 Jun. 13, 2002

(51) Int. Cl.[7] ............................................. H04B 10/00
(52) U.S. Cl. ...................... 359/154; 359/181; 359/136
(58) Field of Search ................................. 359/180, 136, 359/181, 154; 370/320, 335, 342, 441; 375/135

(56) References Cited

U.S. PATENT DOCUMENTS

| 3,900,404 A | 8/1975 | Dachs ........................ 250/199 |
| 5,424,859 A | 6/1995 | Uehara et al. ............... 359/152 |
| 5,550,434 A | 8/1996 | King et al. .................. 315/160 |
| 5,635,915 A | 6/1997 | Gray ...................... 340/825.57 |
| 5,657,145 A | 8/1997 | Smith ......................... 359/181 |
| 5,881,097 A | * 3/1999 | Lilleberg et al. ............. 375/138 |
| 5,903,551 A | * 5/1999 | Kingston et al. ............ 370/335 |
| 6,072,615 A | * 6/2000 | Mamyshev .................. 359/183 |

FOREIGN PATENT DOCUMENTS

| WO | WO 99/53633 | 10/1999 |
| WO | WO 99/53732 | 10/1999 |
| WO | WO 00/30415 | 5/2000 |

* cited by examiner

Primary Examiner—Jason Chan
Assistant Examiner—Christina Y Leung
(74) Attorney, Agent, or Firm—Barbara R. Doutre

(57) ABSTRACT

An interference-robust coded-modulation scheme for optical communications and a method for modulating illumination for optical communications include optical signal transmitters connected to signal multipliers. The signal to be transmitted is multiplied by a pseudo-random noise code and transmitted within the transmitter emissions. A receiver converts the received modulated light and correlates the received signal. An estimate of the signal to be transmitted is made by multiplying the received signal by the noise code and correlating such multiplication over the length of the code. A threshold switch outputs the correlation result to a bit estimator approximately when a deterministic peak of the output signal exceeds a threshold.

40 Claims, 3 Drawing Sheets

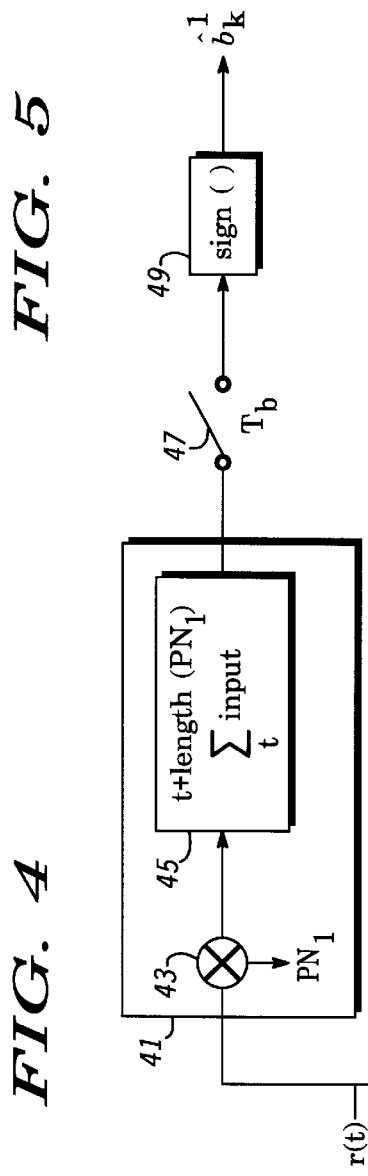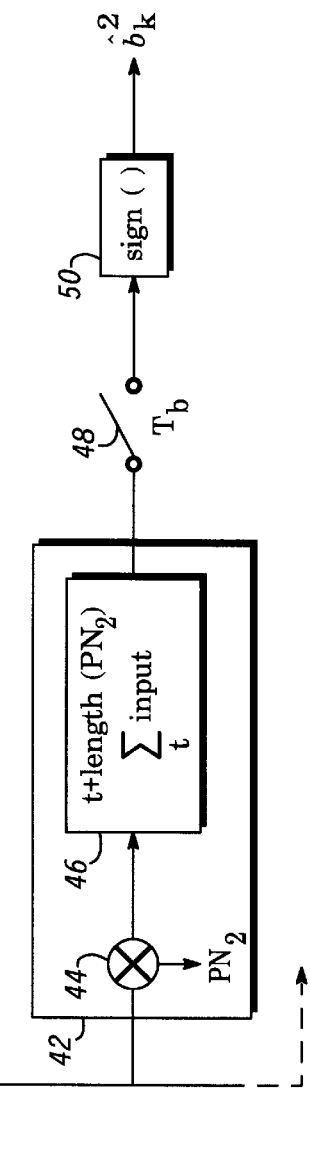
FIG. 4
FIG. 5
FIG. 6

INTERFERENCE-ROBUST CODED-MODULATION SCHEME FOR OPTICAL COMMUNICATIONS AND METHOD FOR MODULATING ILLUMINATION FOR OPTICAL COMMUNICATIONS

BACKGROUND OF THE INVENTION

1. Field of the Invention

The invention lies in the field of electro-optical communications. The invention relates to an interference-robust coded-modulation scheme for optical communications and a method for modulating illumination for optical communications.

2. Description of the Related Art

In the recent past, the Federal Communications Commission ("FCC") has promulgated standards related to the Emergency-911 ("E-911") initiative. The initiative has set the initial standards for a communications system that, in the future, will precisely locate a particular person or object. Particularly, the initiative relates to precisely determining the location of a particular cellular telephone. As a result, location technologies have been developing rapidly. The rush to complete E-911, in particular, has compelled many cellular system designers to develop a scheme that will satisfy the location requirements set by the FCC.

Simultaneously, smaller-scale location opportunities, like personal security and asset-management solutions, are being investigated. The smaller-scale location technologies present many more unsolved problems than the large-scale E-911 technology. One of the most challenging feats resides in the creation of technology that is able to locate a device within structures. As set forth herein, the terms "structure" or "structures" mean any enclosed space having intermediate areas and walls. The terms do not necessarily include only man-made structures, such as buildings, for example. The term "areas" as used herein is defined as any subset of the enclosed space within a structure. An "area" can mean, for example, a small room with four walls and a door, or it can refer to a large room with many walls and doors and with intermediate cubicle-type half-walls.

Equipment that uses radio frequency ("RF") signals to capture Receive Signal Strength ("RSS"), Time Difference of Arrival ("TDoA"), or Angle of Arrival ("AoA") clues have limited location accuracy and often require an expensive supporting infrastructure. RF location schemes like RADAR, GPS, and LORAN have been used for years to locate people and/or objects outdoors. The realities of the indoor environment prevent RF schemes from being employed indoors. Specifically, when RF propagates in a building, the transmitted signal undergoes fading, dispersion, and interference with delayed versions of itself—otherwise known in the art as multipath interference. Such signal impediments make it extremely difficult to configure an indoor RF location system employing RSS, TDOA, or AoA for estimating a location of an object.

In most cases, existing optical in-building infrastructure includes already-installed lights, such as incandescent bulbs, fluorescent lamps, and halogen bulbs, or even LED's or laser diodes. These definitions for the term "light" or "lights" are not exclusive. "Light" can refer to any device used for visible light illumination or invisible light transmission, including, but not limited to, ultraviolet and infrared. Other existing in-building devices include sensors, RF transceivers, and processors that can perform position estimates based on signal strength or some other ranging technology.

Various prior art devices and methods have used lighting for sending information in addition to providing illumination. The first four paragraphs of the background section of International PCT publication WO 99/53732 to Leeb et al. detail the progression of such devices and methods over the past few decades. These paragraphs are hereby incorporated herein by reference. None of the cited patents, however, provide the features of the invention.

For example, WO 99/53732 discloses an apparatus for modulating electromagnetic radiation to transmit information from a visible-light generating lamp such that human-perceptible flicker is eliminated regardless of the information content.

Additionally, International PCT publication WO 00/30415 to Lupton et al. discloses an electronic communications network that uses indoor fixtures, emitting modulated visible light, as transmitters that do not generate human-perceptible flicker.

Finally, International PCT publication WO 99/53633 to Hovorka et al. discloses a communications network similar to WO 00/30415 having an improved bandwidth using a particular coding scheme.

BRIEF DESCRIPTION OF THE DRAWINGS

FIGS. 4 and 5 are schematic diagrams of two transmitters according to the invention; and FIG. 6 is a block diagram of a receiver according to the invention.

DESCRIPTION OF THE PREFERRED EMBODIMENTS

Figure 1:
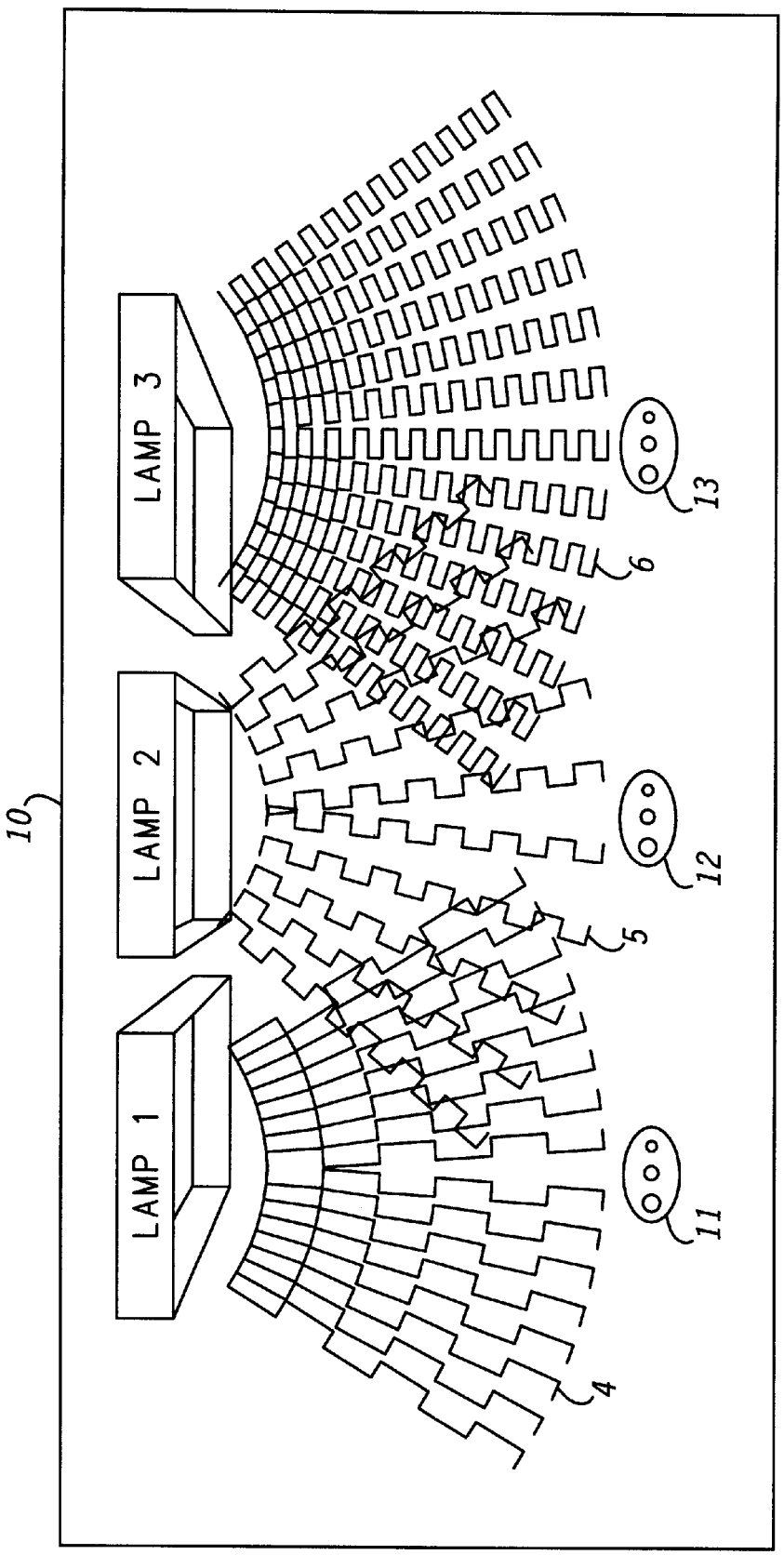
FIG. 1 is an illustrative perspective block diagram of a room with optical transmitters and receivers according to the invention.

It is often forgotten that indoor environments were constructed to minimize audio and optical interference. Walls were erected and doors were installed to keep in-building conversations private and to substantially prevent light from dispersing from one area to another. A typical building, for example, is configured such that room A has one light source and room B has another light source. Thus, the light emitting from each respective source (e.g., the transmitted signal) cannot interfere with light emitting from another source. On the other hand, if RF sources (transmitters) are used, multiple signals originating from one area can and do interfere with each other and also with signals originating from other areas, including areas behind walls. When RF sources are used with in-building location detection systems, the interference skews a location sought to be estimated.

Instead of applying RF signals for determining location, the invention applies optical signal technology in a unique way towards a solution for determining a location of an object inside a structure using existing lighting within that structure. The invention utilizes optical technology to keep the location-determining signals from interfering with each other and uses the particular features of indoor environments to enhance the reliability of determining a location of an object within a structure. An optically based in-building location system and method for determining a location in a structure is disclosed in a co-pending patent application titled "Optically based In-building Location System and Method for Determining a Location in a Structure," which is hereby incorporated herein by reference. The location system and method provides a relative or absolute position reference to a location map that is created by the other in-building devices. As set forth herein, the terms "absolute terrestrial position" or "absolute position" mean a three-dimensional position on the Earth, including positions on the Earth's surface, below the Earth's surface, and above the Earth's surface. Thus, an example absolute terrestrial position could include latitude, longitude, and height above/below sea level. Another example could include an X-Y-Z position with respect to the center of the Earth. Another example could include a country, state, city, address, and height above/below sea level. Further examples could be derived by those having skill in the art.

The art of indoor location and tracking systems is turning to optically assisted location schemes to increase the resolution compared to RF-based systems. Fluorescent lights that, until recently, were solely used to illuminate an office, now can be used to transmit information to receivers that can determine their own absolute terrestrial location based upon the transmitted information. One malady associated with optically based communications systems is inter-light interference ("ILI"). ILI occurs when two adjacent light emissions overlap to such an extent that a receiving device cannot successfully demodulate either signal. The invention solves this problem by being able to resolve at least one optical signal, even when ILI occurs. The invention provides this advantage using a unique modulation and demodulation coding scheme.

The transmitting infrastructure of the invention is unique in that there is little or no installation cost. The invention utilizes existing in-building infrastructures (i.e., in-building lighting grids). In most location determining systems, a significant portion of the cost is associated with the purchase of the infrastructure and its installation. Today, it is not unheard of to install one RF base station in every room or at least in every other room in order to provide sufficient indoor coverage. The infrastructure for accommodating the system and method of the invention, however, can already be found in almost every office building.

Converting existing lighting systems to implement the invention can be performed by adding a modulation device in series with some of the lighting fixtures. Preferably, the modulation device can be part of a light ballast, and conversion can be performed by merely changing the ballast of some of the lighting fixtures. Particularly, each room of a structure according to the invention includes at least one of such ballasts. Ballast manufacturers are designing tomorrow's ballasts to perform a multitude of tasks. For example, it is anticipated that future ballasts will have a unique address similar to an Internet Protocol ("IP") address. These ballasts also have dimming and could include remote control capabilities and optical information transmission features. Providing that the absolute location of a given light source (transmitter) is known, modulation of optical transmission according to the invention can be applied to create a robust indoor location solution.

The system and method of the invention enhances the ability to provide a very accurate indoor location estimate required by indoor location systems available or known today using a unique modulation scheme.

Although the invention is illustrated and described herein as embodied in an interference-robust coded-modulation scheme for optical communications and a method for modulating illumination for optical communications, it is nevertheless not intended to be limited to the details shown because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

In all the figures of the drawing, sub-features and integral parts that correspond to one another bear the same reference symbol in each case.

In any communications system, the ultimate objective is to transfer information from one device to another device. Whether the devices transfer that information through RF, light, or any other wireless medium, the effect of interference from another transmitter can be the demise of the system.

Referring now to the figures of the drawings in detail and first, particularly to FIG. 1 thereof, there is shown an example office environment 10 where there are three modulated light sources, lamps 1, 2, and 3, and three detection devices 11, 12, 13. Three light modulations 4, 5, 6 are represented in FIG. 1 as emitting from lamps 1, 2, and 3, respectively. Accordingly, it is apparent that transmissions from adjacent light sources overlap. In the example of FIG. 1, the emission 4 from lamp 1 overlaps the emission 5 from lamp 2, the emission 6 from lamp 3 overlaps the emission 5 from lamp 2, and the emission 5 from lamp 2 overlaps the emissions 4, 6 from lamps 1 and 3.

If three lights as shown in the example of FIG. 1 were to transmit using a non-coded modulation scheme such as phase modulation, phase shift keying ("PSK"), frequency shift keying ("FSK"), amplitude modulation ("AM"), or frequency modulation ("FM"), and a receiver was placed in a position where it could receive an equally powerful transmission from each lamp, a receiver would not be able to demodulate/identify/discriminate any of these signals due to inter-light interference. In addition, when that receiver is placed slightly closer to one lamp than to another, if the ILI is not too great, only the lamp closest to the receiver will be demodulated/identified/discriminated for such modulation schemes. The invention overcomes these problems. By using the modulation scheme described below, at least one lamp has a significantly high probability of being detected and, in an overlapping region between the lamps, there is a similarly high probability that all overlapping signals will be detected.

Figure 2:
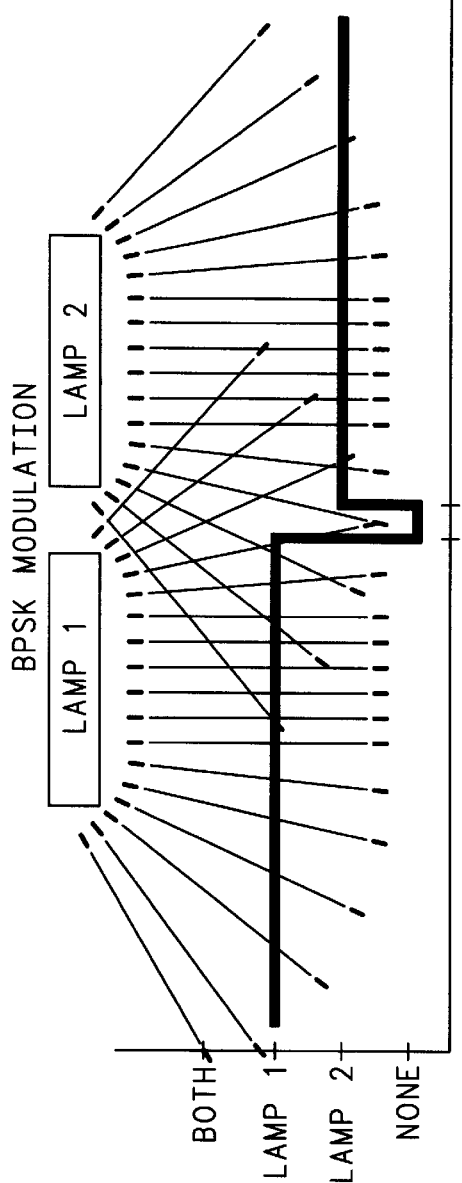
FIG. 2 is an optical detection graph of a receiver applying a prior art modulation.
Figure 3:
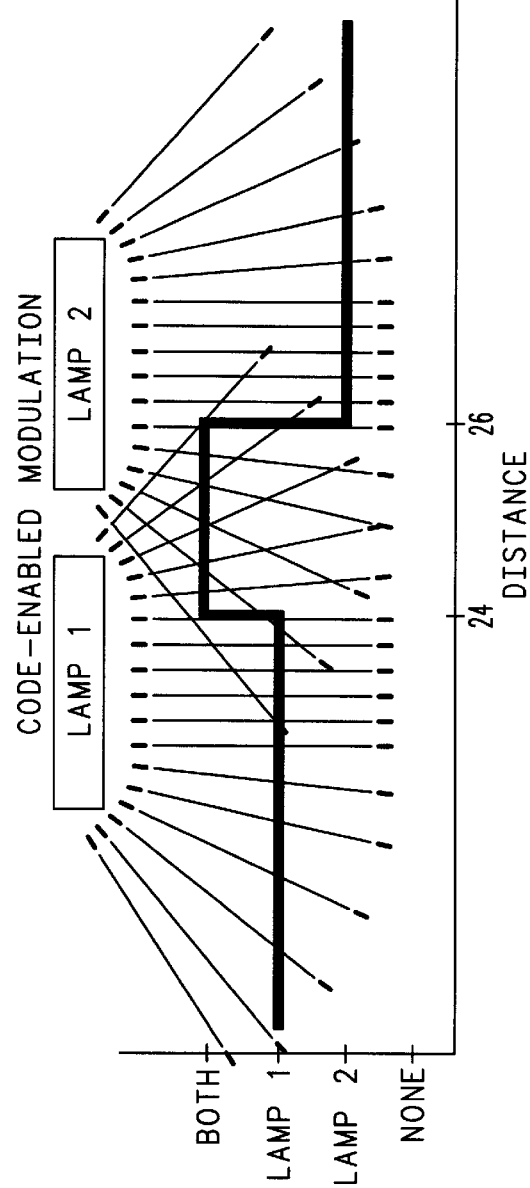
FIG. 3 is an optical detection graph of a receiver applying a modulation according to the invention.

FIGS. 2 and 3 illustrate how the coded-modulation scheme of the invention outperforms binary phase shift keying ("BPSK"), for example, for a two-lamp 1, 2 architecture. The x-axis represents a perpendicular distance in generic units below the lamps 1, 2, and the y-axis indicates which lamp signal can be demodulated for a corresponding receiver position below the lamps 1, 2. In this example, the dashed and dash-double dot lines emanating from the lamps 1, 2, respectively, indicate emitted light, with the end point of the lines indicating that an emitted light signal will not be detected by a receiver 11, 12, 13. Thus, with respect to FIG. 3 for example, a receiver will not be able to detect a signal from lamp 2 until it is further to the right than point 24 on the x-axis.

FIG. 2 shows a graph applying a BPSK modulation scheme. For a position to the left of point 20 on the x-axis, a BPSK receiver will be able to detect lamp 1. For a position to the right of point 22 on the x-axis, a BPSK receiver will be able to detect lamp 2. However, for the area between points 20 and 22, it is very likely that neither of the lamps 1, 2 can be detected. This area will be referred to as a null area. Thus, in regions where lamp emissions do not overlap, a BPSK detector/receiver can only detect/demodulate a single, closest lamp or the lamp with the strongest emissions. The size of the region between points 20 and 22 is only illustrative. In an actual example, the null area can be large or small depending on the signal strength of the emitted light, the sensitivity of the receiver, and the position of the lamps, for example. Nonetheless, prior art modulation techniques do not eliminate these null areas.

The coded-modulation scheme of the invention, in contrast, virtually eliminates the existence of null areas and gives the receiver of the invention a high probability of demodulating all lamps. Thus, even where more than two lamps create an area that would be null in prior art systems, a receiver of the invention within that null area can still demodulate all of the lamps. Specifically, as shown in FIG. 3, for a position to the left of point 24 on the x-axis, a receiver using the coded-modulation scheme of the invention will be able to detect lamp 1. For a position to the right of point 26 on the x-axis, a receiver using the coded-modulation scheme of the invention will be able to detect lamp 2. Significantly, for the area between points 24 and 26, a receiver using the coded-modulation scheme of the invention can detect and identify both of the lamps 1, 2.

The coded-modulation scheme of the invention follows with respect to FIGS. 4 to 6.

The invention employs a coded-modulation where each light transmits the illumination using a modulation identification code, referred to herein as a pseudo-random noise ("PN") code. The PN code has unique properties allowing it to be distinguished from other PN codes being transmitted by adjacent lights. Adjacent lights are defined as nearby lights that can be detected by a receiver 11, 12, 13 in addition to a light already detected by a receiver 11, 12, 13. Due to the attenuation properties of transmitted light, there does not have to be a large number of different PN codes assigned to lights in the lighting infrastructure. Preferably, the PN codes are chosen such that there is no duplicate PN code within one area or room of a structure. Particularly, the number of PN codes is as small as possible. Because light from one area does not penetrate into another area (most typically due to an opaque intermediate wall), a PN code in one room can be duplicated in another adjacent room, and although such duplication is not required it is preferable.

For each PN code that is used in the system, each receiver must employ a corresponding correlation branch. If N PN codes are used, each receiver typically would employ N correlators. The increase in correlator branches raises hardware costs, power drain, and receiver complexity. For that reason, it is preferable to implement PN code reuse much like frequency reuse in cellular systems.

In the example illustrated in FIG. 3, lamps 1 and 2 are modulated according to the structure shown in FIGS. 4 and 5 where:

$b_k^x$ is the $k^{th}$ information bit for lamp x (x=1 and 2);

$PN_x$ is a PN code unique to lamp x when PN code reuse is not applied;

$s_x(t)$ is a data stream (made up of bits) to be transmitted from lamp x; and $r(t)=s_1(t)+s_2(t)+n$ (n being equal to all other channel impairments).

Here, $PN_1$ is a PN code unique to lamp 1. Lamp 2 has a similar architecture but has a different PN code, $PN_2$, unique to lamp 2, in other words, $PN_1 \ne PN_2$. $b_k^2$ is the $k^{th}$ information bit for lamp 2, which is likely independent from $b_k^1$. Lamp 1 transmits a bit data stream $s_1(t)$, and Lamp 2 transmits a different bit data stream $s_2(t)$.

Referring to FIGS. 4 and 5, the two data streams to be transmitted in the example are $s_1(t)$ and $s_2(t)$, which can be binary data streams. The data streams are input to multipliers 31, 32 and are respectively multiplied by a PN code $PN_1$, $PN_2$. The multiplied signal is then output by the multipliers 31, 32 and is used to modulate the lamps 1, 2, which transmit the signals $s_1(t)$ and $s_2(t)$, respectively.

If, for example, the data streams $b_k^1$, $b_k^2$ are 100-bits long and the PN codes, $PN_1$, $PN_2$ are seven-chips long, then the lamps 1, 2 repeatedly and continuously transmit a 700-chip signal $s_1(t)$, $s_2(t)$. A unit for a PN code is called a chip.

A receiver 11, 12, 13 within receiving range of the lamps 1, 2 will, therefore, receive r(t). A typical receiver 11, 12, 13 architecture for this example may be configured as shown in FIG. 6.

In order to demodulate the two signals $s_1(t)$ and $s_2(t)$ in r(t), a receiver 11, 12, 13 according to the invention contains signal correlators. In this example, two signal correlators 41, 42 are illustrated. Preferably, the number of signal correlators in a receiver 11, 12, 13 is equal to at least the number of unique PN codes. The equality is selected so that the receiver 11, 12, 13 can simultaneously demodulate (in parallel) every possible PN-coded transmission. The number of signal correlators, however, is not fixed. The receiver 11, 12, 13 can have a little as one correlator, which could rotatably apply all of the PN codes to a single multiplier 43 according to a single configuration set forth in FIG. 6, for example. Alternatively, equivalent correlation configuration schemes known to those skilled in the art could be applied for receiving all possible PN codes. Reducing the number of signal correlators decreases cost of a receiver, but could increase the response time for identifying a given optical transmitter 1, 2, 3. Nonetheless, such an increase is not necessarily a disadvantage. A receiver 11, 12, 13 used in the location scheme disclosed in the above-mentioned co-pending patent application, for example, will typically not be traveling in a structure at a high rate of speed. Therefore, the receiver 11, 12, 13 has sufficient time to detect and discriminate a transmitting light 1, 2, 3 well before the user holding the receiver 11, 12, 13 exits the area.

To demodulate the bits $b_k^1$, $b_k^2$ from the received signal r(t), a receiver 11, 12, 13 having a configuration shown in FIG. 6 correlates the received signal, r(t) (containing both $s_1(t)$ and $s_2(t)$) with its two correlators 41, 42. The correlators 41, 42 each contain, in series, a multiplier 43, 44 and an integrator or summation device 45, 46.

The number of bits of the transmitted signal $s_1(t)$ and $s_2(t)$ is fixed and the length of the PN code is fixed. The integrator sums $PN_1*r(t)$. The output of this summation will generate peaks that occur in a deterministic fashion. The deterministic nature of the output signal provides sample and bit synchronization for the demodulator. Specifically, when the output of $PN_1*r(t)$ exceeds some threshold, a deterministic peak has occurred. For example, if the PN code length is 7, a peak is found when the correlator output exceeds a threshold that is somewhat less than 7. To demodulate the entire transmitted signal $s_1(t)$, $s_2(t)$, therefore, the correlation is repeated until all bits are received. Preferably, for a receiver 11, 12, 13 having multiple correlators, the correlation scheme is repeated in parallel through separate correlators, one for each PN code.

Specifically, correlation begins by applying the received signal r(t) to one input of each multiplier 43, 44, and by applying each PN code $PN_1$, $PN_2$ to the other input of the respective multiplier 43, 44. The output of each multiplier 43, 44 is fed to a respective integrator or summation device 45, 46. Each bit of the received signal r(t) (multiplied again by the PN code) is summed in the integrator over the length of the PN code. Assuming the first ten bits of $s_1(t)$ are all 1's and the PN code for lamp 1 is "1, 1, 1, −1, −1, 1, −1", then the first ten bits multiplied by $PN_1$ will each be a seven-chip word "1, 1, 1, 1, −1, 1, −1". Multiplying each of these words by $PN_1$ again and summing the seven digits gives a resulting value equal to +7. A deterministic peak is generated because the resulting value is greater than the defined threshold of less than seven.

The PN codes are preferably chosen such that when one PN code is correlated with itself (auto-correlated), a strong peak is output (i.e., an extreme value). Correspondingly, the PN codes are also preferably chosen such that when one PN code is cross-correlated with another PN code, a result is less than the deterministic autocorrelation peak (i.e., a number less than the PN code length and as close to zero as possible). For example, if the PN code for lamp 1 is "1, 1, 1, −1, −1, 1, −1" and the PN code for lamp 2 will be "1, 1, −1, 1, −1, −1, 1", a cross-correlation results in a −1, which is substantially closer to 0 than +7. Simply put, the PN code is a key to unlock the transmitted signal with a high degree of accuracy. Therefore, the correlation according to the invention insures that at least one signal 4, 5, 6 will be received and discriminated, and, preferably, all detectable signals will be received and discriminated even in the presence of ILI.

When a peak is generated, the switch 47, 48 is closed and a "+7" is output. The switch 47, 48 output, however, is not in binary form (0 or 1). Thus, the output is passed on to a bit estimator 49, 50, which estimates $b_k$. Upon receipt of a "+7", for example, bit estimator 49 outputs a "1" as the first bit $b_1^{\ 1}$ of a correlated received signal $b_k^{\ 1}$.

The correlation is repeated by "shifting" the PN code multiplication one chip towards the end of the received signal r(t). Because the next seven bits of the received signal r(t) are the second to seventh chips of the first seven-bit word and the first chip of the second seven-bit word, the correlation of these seven chips will not produce a +7. Instead, "1, 1, 1, −1, −1, 1, −1" is multiplied by "1, 1, −1, −1, 1, −1, 1", which produces a summed result of −1. Accordingly, this correlation and the following five correlations will not produce an extreme value as the summed result and the switch 47, 48 will not close. When the eighth multiplication occurs, the words are synchronized and the multiplication and sum will result in another +7. Because the first ten bits of $b_k$ are all 1's, forecasting the process out for the first seventy bits of $s_1(t)$ will result in a +7 for every seventh correlation. The correlation repeats for all seven hundred bits of $s_1(t)$ at a correlation rate seven times that of the $s_1(t)$ bit rate. Accordingly, at the end of the correlation of the seven-hundredth bit of $s_1(t)$, an estimation of the signal $b_k^{\ 1}$ ($\hat{b}_k^{\ 1}$) will have been output. Because seven hundred decisions must be made to recreate the 100-bit transmitted signal $s_1(t), s_2(t)$, the correlator 41, 42 speed is at least seven times the bit rate of the transmitted signal $s_1(t), s_2(t)$ Preferably, for a seven-bit PN code, the correlator 41, 42 speed is equal to seven times the bit rate.

Because the receiver 11, 12, 13 enters the transmission range of the lamps 1, 2 at a non-ideal time, the receiver 11, 12, 13 is not synchronized with the transmission of the data streams. To achieve synchronization, one example data stream that will help achieve timing may have a header including all 1's. Thus, a correlator will be able to synchronize receipt of the transmitted signals $s_1(t), s_2(t)$ using these first timing bits. The next ten bits, for example, can be the unique light ID or position. Accordingly, for a ten bit ID, there are $2^{10}$ (1024) possible light IDs. This ID bit length is only an illustrative example. Preferably, the ID bit length is selected to be large enough for including all desired transmitter IDs or positions. The remaining bits in the data stream can include other information and stop bits.

During synchronization, $PN_1 * r(t+T)$ will be calculated at a rate that is (PN code length)-times faster than the bit rate. After synchronization, the correlator does not necessarily operate as fast but only needs to produce an output at sample time $t+T_b$. Once PN code synchronization is achieved, the switches 47, 48 synchronously sample the output of the correlators to determine $b_k$ at a time $t+T_b$, where $T_b$ equals the duration of one bit.

Connected to the output of the correlators 41, 42, is a synchronized switch 47, 48, which is connected at the output thereof to a bit estimator 49, 50, which estimates bk.

After demodulating, the estimated signals $\hat{b}_k^{\ 1}, \hat{b}_k^{\ 2}$ appear as the output of the bit estimator 49, 50. When demodulation is complete, a relative in-building location and/or absolute terrestrial location scheme disclosed in the above-mentioned co-pending patent application can use the outputted signal $\hat{b}_k^{\ 1}, \hat{b}_k^{\ 2}$ for identifying the corresponding lamp 1, 2. From the identification and the position of the lamps 1, 2, the relative position of the receiver 11, 12, 13 with respect to the lamps 1, 2 can be determined. From these two positions, an absolute position of the receiver 11, 12, 13 can be determined and displayed to the user, for example.

The coded-modulation scheme of the invention reduces the ILI that occurs when an optical detector receives signals from two or more adjacent lights. Because of the extreme-value-peak-detection requirement, the coded-modulation scheme provides a robust solution for discriminating many overlapping lights exhibiting ILI in a null area. As such, the invention allows an optically based location detection system to resolve a relative or absolute position of a receiving device with a high degree of precision.

The system and method as described herein includes a description of various preferred and alternative embodiments. The description should not be construed as disclosing the only way to configure the system or to perform the method.

We claim:

1. A method for communicating an optical signal, which comprises:
   providing at least one optical transmitter for generating an illumination state based upon at least one input signal;
   changing the illumination state by generating the at least one input signal from a supplied signal multiplied by a given code having a length; and
   correlating at least one received illumination state in an optical receiver by:
   multiplying the at least one received illumination state by the given code to generate at least one multiplied state signal;
   summing the at least one multiplied state signal over the length of the code to generate an output signal; and
   outputting the output signal from a bit estimator through a threshold switch approximately when a deterministic peak of the output signal exceeds a threshold.

2. The method according to claim 1, wherein the at least one optical transmitter is a light in a lighting infrastructure.

3. The method according to claim 1, wherein the at least one optical transmitter transmits at least one optical emission selected from the group consisting of visible, infrared, and ultraviolet.

4. The method according to claim 1, which further comprises performing the changing step by modulating the illumination state.

5. The method according to claim 1, wherein the supplied signal is a digital data stream.

6. The method according to claim 1, which further comprises selecting the given code such that when the given code is correlated with itself a strong deterministic peak results.

7. The method according to claim 6, wherein the given code is one of a plurality of given codes, and selecting a given code such that when the given code is cross-correlated with any other of the plurality of given codes a result is less than the deterministic peak of the autocorrelation.

8. The method according to claim 7, wherein the result is substantially equal to zero.

9. The method according to claim 1, which further comprises performing the correlating and outputting steps at a rate at least equal to a rate of change of the at least one changed illumination state.

10. The method according to claim 9, wherein the given code has n chips and the rate is n-times faster than the rate of change of the at least one changed illumination state.

11. The method according to claim 9, wherein the given code has n chips and the rate is n-times faster than the rate of change of the at least one changed illumination state during a synchronization stage.

12. The method according to claim 1, which further comprises:
performing the correlating and outputting steps in synchronization with a rate of change of the at least one changed illumination state; and
synchronously sampling an output of the at least one signal correlator with a threshold switch to create an output signal.

13. The method according to claim 1, wherein the given code is one of a plurality of given codes, and performing the correlating step by correlating with one of a number of signal correlators, the number being at most equal to a number of respective different given codes.

14. The method according to claim 1, which further comprises repeating the correlating and outputting steps for each chip of the at least one input signal.

15. The method according to claim 1, wherein the threshold is at most equal to the length of the given code.

16. The method according to claim 1, which further comprises performing the outputting step by converting, with the bit estimator, the output signal into an estimated output signal estimating the at least one received illumination state received by the optical receiver from the at least one optical transmitter.

17. The method according to claim 1, which further comprises supplying the output signal from the bit estimator to a processor for determining a location of the receiver with respect to the at least one optical transmitter.

18. The method according to claim 1, wherein the threshold switch is a sampler.

19. The method according to claim 1, wherein the given code is one of a plurality of given codes, the at least one optical transmitter is one of a plurality of optical transmitters, and selecting a given code of a particular optical transmitter to be different from given codes of optical transmitters adjacent to the particular optical transmitter.

20. A method for communicating an optical signal, which comprises:

multiplying at least one input signal by a respective code to generate at least one multiplied signal;
changing a transmitted illumination state of at least one optical transmitter based upon the at least one multiplied signal;
receiving the transmitted illumination state of the at least one optical transmitter with an optical receiver and converting the received transmitted illumination state into at least one received signal;
supplying the at least one received signal to at least one signal correlator having a received signal multiplier and a received signal integrator;
multiplying the at least one received signal by a respective code with the received signal multiplier to generate at least one second multiplied signal;
summing each chip of the at least one second multiplied signal over a length of the respective code with the received signal integrator of the at least one signal correlator;
outputting an output signal of the signal integrator to a bit estimator through a threshold switch approximately when a deterministic peak exceeds a threshold of the switch; and
converting the output signal of the signal integrator to a demodulated output signal with the bit estimator.

21. The method according to claim 20, which further comprises performing the converting, supplying, multiplying, summing, outputting, and converting steps at a rate at least equal to a rate of change of the transmitted illumination state of the at least one optical transmitter.

22. The method according to claim 20, which further comprises:
performing the converting, supplying, multiplying, summing, outputting, and converting steps in synchronization with a rate of change of the transmitted illumination state of the at least one optical transmitter; and
synchronously sampling an output of the at least one signal correlator with a threshold switch to create a demodulated output signal.

23. The method according to claim 20, which further comprises performing the converting, supplying, multiplying, summing, outputting, and converting steps simultaneously in parallel for each received transmitted illumination state received by the receiver.

24. The method according to claim 20, which further comprises repeating the converting, supplying, multiplying, summing, outputting, and converting steps for each chip of each received transmitted illumination state.

25. The method according to claim 20, which further comprises performing the summing step by summing the product of each respective code and the at least one received signal for generating an output having peaks occurring in a deterministic fashion.

26. The method according to claim 20, which further comprises performing the converting step by converting, with the bit estimator, the output signal of the signal integrator into an estimated output signal estimating the received transmitted illumination state received by the optical receiver from at least one optical transmitter.

27. The method according to claim 20, which further comprises supplying the output signal from the bit estimator to a processor for determining a location of the receiver with respect to the at least one optical transmitter.

28. The method according to claim 20, wherein the at least one optical transmitter is one of a plurality of optical transmitters, the respective code is one of a plurality of respective pseudo-random noise codes, and wherein the method further comprises the step of selecting a pseudo-random noise code of a particular optical transmitter to be different from pseudo-random noise codes of optical transmitters adjacent to the particular optical transmitter.

29. The method according to claim 20, wherein the at least one optical transmitter is one of a plurality of optical transmitters, the respective code is one of a plurality of respective pseudo-random noise codes, the at least one input signal is one of a plurality of input signals, the at least one signal correlator is one of a plurality of signal correlators each having a received signal multiplier and a received signal integrator, the threshold switch is one of plurality of threshold switches, and the bit estimator is one of a plurality of bit estimators.

30. A method for communicating input signals through illumination of lights in a lighting infrastructure of a structure, which comprises:

multiplying each input signal by a respective different pseudo-random noise code to generate a corresponding plurality of multiplied signals;

changing a transmitted illumination state of lights based upon a respective one of the plurality of multiplied signals;

receiving transmitted illumination states of some of the lights with an optical receiver and converting the received transmitted illumination states into a received signal;

supplying the received signal to signal correlators, each of the signal correlators having a received signal multiplier and a received signal integrator;

multiplying the received signal by one pseudo-random noise code with each received signal multiplier in each signal correlator and outputting a second multiplied signal from each received signal multiplier;

summing each chip of the second multiplied signal in each signal correlator over a length of the one pseudo-random noise code with each received signal integrator;

outputting an output signal of each signal integrator to a bit estimator through a threshold switch approximately when a deterministic peak exceeds a threshold value of each threshold switch;

converting an output signal of each signal integrator into a demodulated output signal with each bit estimator; and repeating the steps of receiving, converting, supplying, multiplying, summing, outputting, and converting until each input signal is estimated.

31. An optical communication system, comprising:

a light source having a function of illuminating an area with visible light;

a transmitter for transmitting optical signals;

a signal multiplier for multiplying a supplied signal by at least one code, said at least one signal multiplier having a multiplier output connected to said at least one optical transmitter for outputting a multiplied signal;

said transmitter configured to modulate the light source to transmit the optical signals based upon the multiplied signal;

a receiver for receiving modulated optical signals output by said optical transmitter, said receiver having a converter for converting received modulated light into a received signal and at least one signal correlator for correlating the received signal, said at least one signal correlator having a correlator output, and wherein said at least one signal correlator has a received signal multiplier and a received signal integrator, said received signal multiplier being configured to multiply the received signal by the at least one code, the at least one code having a length and said received signal integrator being configured to sum each chip of the received signal over the length;

at least one switch connected to said correlator output and having a switch output for outputting a correlated signal exceeding a given threshold; and at least one bit estimator connected to said switch output, said at least one bit estimator configured to output an estimation of the supplied signal.

32. The communication system according to claim 31, wherein said light source is a light in a lighting infrastructure.

33. The communication system according to claim 31, wherein said light source is one of a group consisting of incandescent bulbs, fluorescent lamps, halogen bulbs, light emitting diodes, and laser diodes.

34. The communication system according to claim 31, wherein the supplied signal is a digital data stream.

35. The communication system according to claim 31, wherein said receiver, said at least one switch, and said at least one bit estimator operate at a rate at least equal to a modulation rate of said transmitter.

36. The communication system according to claim 35, wherein the at least one code has n chips and said rate is n-times faster than said modulation rate.

37. The communication system according to claim 35, wherein said receiver, said at least one switch, and said at least one bit estimator operate simultaneously in parallel.

38. The communication system according to claim 31, including:

a signal generator for generating the supplied signal; and a code generator for generating the at least one code multiplying the received signal by one pseudo-random noise code with each received signal multiplier in each signal correlator and outputting a second multiplied signal from each received signal multiplier;

summing each chip of the second multiplied signal in each signal correlator over a length of the one pseudo-random noise code with each received signal integrator;

outputting an output signal of each signal integrator to a bit estimator through a threshold switch approximately when a deterministic peak exceeds a threshold value of each threshold switch;

converting an output signal of each signal integrator into a demodulated output signal with each bit estimator; and repeating the steps of receiving, converting, supplying, multiplying, summing, outputting, and converting until each input signal is estimated.

39. An optical communication system, comprising:

a light source having a function of illuminating an area with visible light;

a transmitter for transmitting optical signals;

a signal multiplier for multiplying a supplied signal by at least one code, said at least one signal multiplier having a multiplier output connected to said at least one optical transmitter for outputting a multiplied signal;

said transmitter configured to modulate the light source to transmit the optical signals based upon the multiplied signal;

a receiver for receiving modulated optical signals output by said optical transmitter, said receiver having a converter for converting received modulated light into a received signal and at least one signal correlator for correlating the received signal, said at least one signal correlator having a correlator output;

at least one switch connected to said correlator output and having a switch output for outputting a correlated signal exceeding a given threshold, said at least one switch having a threshold value at most equal to said given threshold and said switch output being configured to output a correlated signal exceeding a given threshold approximately when a deterministic peak exceeds said threshold value; and at least one bit estimator connected to said switch output, said at least one bit estimator configured to output an estimation of the supplied signal.

40. An optical communication device, comprising:

means for multiplying a plurality of input signals each by a respective different pseudo-random noise code to generate a corresponding plurality of multiplied signals;

means for changing a transmitted illumination state of each of a plurality of optical transmitters based upon a respective one of the plurality of multiplied signals;

means for receiving transmitted illumination states of some of the plurality of optical transmitters with an optical receiver and converting the received transmitted illumination states into a received signal;

means for supplying the received signal to a number of signal correlators, each signal correlator having a received signal multiplier and a received signal integrator;

means for multiplying the received signal by one pseudo-random noise code with each received signal multiplier in each signal correlator and outputting a second multiplied signal from each received signal multiplier;

means for summing each chip of the second multiplied signal in each signal correlator over a length of the one pseudo-random noise code with each received signal integrator;

means for outputting an output signal of each signal integrator to a bit estimator through a threshold switch approximately when a deterministic peak exceeds a threshold value of each threshold switch; and means for converting an output signal of each signal integrator into a demodulated output signal with each bit estimator.

* * * * *

UNITED STATES PATENT AND TRADEMARK OFFICE
CERTIFICATE OF CORRECTION

PATENT NO. : 6,542,270 B2  Page 1 of 1
DATED : April 1, 2003
INVENTOR(S) : Matthew R. Perkins et al.

It is certified that error appears in the above-identified patent and that said Letters Patent is hereby corrected as shown below:

<u>Column 12,</u>
Lines 38 through 56, delete existing claim 38 and insert therefor:

-- The communication system according to claim 31, including:
    a signal generator for generating the supplied signal; and
    a code generator for generating the at least one code. --

Signed and Sealed this

Twenty-ninth Day of July, 2003

JAMES E. ROGAN
*Director of the United States Patent and Trademark Office*